US010293571B2

(12) United States Patent
Granados Pelaez et al.

(10) Patent No.: US 10,293,571 B2
(45) Date of Patent: *May 21, 2019

(54) MULTILAYER LINING PLATE FOR HORIZONTAL SUPPORT

(71) Applicant: EURO TRADE FLOORING, S.L., Sant Esteve Ses Rovires (ES)

(72) Inventors: David Granados Pelaez, Barcelona (ES); Luis Fernandez Lopez, Barcelona (ES)

(73) Assignee: EURO TRADE FLOORING, S.L., Sant Esteve Ses Rovires (ES)

( * ) Notice: Subject to any disclaimer, the term of this patent is extended or adjusted under 35 U.S.C. 154(b) by 20 days.

This patent is subject to a terminal disclaimer.

(21) Appl. No.: 15/420,755

(22) Filed: Jan. 31, 2017

(65) Prior Publication Data

US 2017/0136725 A1    May 18, 2017

Related U.S. Application Data

(63) Continuation-in-part of application No. 14/493,668, filed on Sep. 23, 2014, now Pat. No. 9,593,493.

(30) Foreign Application Priority Data

May 20, 2014 (ES) .................................. 201430727

(51) Int. Cl.
*B32B 3/06* (2006.01)
*E04F 15/02* (2006.01)
(Continued)

(52) U.S. Cl.
CPC ............... *B32B 3/06* (2013.01); *B32B 27/08* (2013.01); *B32B 27/20* (2013.01); *B32B 27/304* (2013.01);
(Continued)

(58) Field of Classification Search
CPC ....................................................... B32B 3/06
(Continued)

(56) References Cited

U.S. PATENT DOCUMENTS 9,593,493 B2 *   3/2017  Granados Pelaez .. E04F 15/105
2010/0297411 A1 * 11/2010  Tsai ......................... B32B 9/02
                                                           428/213

FOREIGN PATENT DOCUMENTS

DE        7438712 U   *  3/1975  ............ E04F 15/022
DE       10163435 C1      2/2003
(Continued)

OTHER PUBLICATIONS

European Search Report dated Nov. 23, 2015 from the European Patent Office in counterpart application No. 15382260.
(Continued)

*Primary Examiner* — Brent T O'Hern
(74) *Attorney, Agent, or Firm* — Sughrue Mion, PLLC

(57) ABSTRACT

The invention relates to a multilayer lining plate for essentially horizontal support surfaces such as floors or floor coverings, comprising a main layer having at least two longer sides and two shorter sides, including at least one part, and a ductile upper decorative layer, wherein the lining plate comprises along an outer edge of each of the longer sides of the main layer a ductile machinable portion that can be machined to form a connecting profile for connection of the lining plate with other plates; wherein the at least one part of the main layer is more rigid than the upper decorative layer; and wherein the at least one part of the main layer is made of magnesium oxide, fibrocement or mortar with perlite and/or vermiculite and/or cellulose.

19 Claims, 3 Drawing Sheets

(51) Int. Cl.
   *E04F 15/10*    (2006.01)
   *B32B 27/08*    (2006.01)
   *B32B 27/30*    (2006.01)
   *B32B 27/20*    (2006.01)

(52) U.S. Cl.
   CPC ...... *E04F 15/02038* (2013.01); *E04F 15/105* (2013.01); *E04F 15/107* (2013.01); *B32B 2262/067* (2013.01); *B32B 2471/00* (2013.01); *E04F 2201/048* (2013.01); *E04F 2203/08* (2013.01); *Y10T 156/1052* (2015.01); *Y10T 428/192* (2015.01); *Y10T 428/24802* (2015.01)

(58) Field of Classification Search
   USPC .......................................................... 428/56
   See application file for complete search history.

(56)         References Cited

FOREIGN PATENT DOCUMENTS

| DE | 102012000468 | A1 | 7/2013 |
|----|--------------|----|--------|
| EP | 2586929 | A1 | 5/2013 |
| WO | 2011153916 | A1 | 12/2011 |
| WO | 2012139510 | A1 | 10/2012 |
| WO | 2012155794 | A2 | 11/2012 |

OTHER PUBLICATIONS

Search report dated Jun. 29, 2015, issued by the Spanish Office of Patents in corresponding Spanish Application No. 201430727.

\* cited by examiner

MULTILAYER LINING PLATE FOR HORIZONTAL SUPPORT

CROSS-REFERENCE TO RELATED APPLICATIONS

This application is a Continuation-in-Part of application Ser. No. 14/493,668, filed Sep. 23, 2014, now U.S. Pat. No. 9,593,493, claiming priority based on Spanish Patent Application No. P 201430727, filed May 20, 2014, the contents of all of which are incorporated herein by reference in their entirety.

TECHNICAL FIELD OF THE INVENTION

The present invention relates to a multilayer lining plate for lining essentially horizontal support surfaces such as floors or floor coverings. The surfaces to be lined can be formed by more or less even floors with a concrete or cement finish; said floors can also have smooth or rough finishes or can even be existing floors that already include a previously installed lining, such as tiled floors, for example.

The lining plate comprises a main layer with at least one part made of a rigid or semi-rigid material and a ductile or flexible upper decorative layer, for example, a sheet of vinyl material.

BACKGROUND OF THE INVENTION

Vinyl floors or floor coverings, the composition of which is particularly based on a polyvinyl chloride (PVC) lining, are well-known today as replacements for linoleum coverings due to their impermeability, resistance to abrasion, and chemical agents, as well as their non-slip and easy-to-clean properties. Therefore, such lining is extremely suitable for high-traffic areas that require frequent cleaning, such as kitchen, bathroom or children's playroom floors.

In addition to being characterized by their composition, vinyl linings are characterized by being provided with a decorative layer imitating typical linings ranging from those that look like wood, granite or ceramic, to others having more cutting-edge designs that can be obtained by printing any design with different drawings, patterns and colors.

These vinyl linings are found on the market mainly in two formats, i.e., in the form of tiles or boards and in the form of continuous rolls. Linings in tile format are more useful if a part experiences any deterioration because it is only necessary to replace the tile in question and not the entire sheet of the roll.

With respect to placement, vinyl linings in the form of a tile require the application of a dispersion adhesive, gum or glue on the surface to be placed in contact with the floor, although for some time now tiles sold on the market have a self-adhesive layer protected by a sheet of paper that can be peeled off for direct application on the surface of the floor covering or floor to be covered. Vinyl tiles with a perimetral anchoring system for being installed directly on a subfloor can also be found on the market. Such tiles can be installed in a floating manner, i.e., simply connecting the parts to one another without having to adhere them to the surface.

It must be pointed out that vinyl linings have the drawback of having very poor dimensional stability because heat and temperature changes greatly affect them. Therefore, in adverse conditions of heat exposure, a vinyl tile will experience an expansion effect of up to 0.15% with respect to its initial size at room temperature of ±23° C. It can also bow and deform, losing its initial planimetry and therefore becoming detached from its support, or it can become disconnected from adjacent parts in the case of a floating installation. Vinyl linings are therefore unsuitable for floor coverings in installations where there are marked temperature changes (≥15° C.). Cold temperatures also significantly affect the dimensional stability of vinyl, being able to experience a shrinkage effect of more than 0.2% with respect to its initial size at room temperature of ±23° C. Generally, any installation having vinyl floors, particularly those installed in a floating system, must remain at a constant temperature of between 15° C. and 25° C.

To prevent stability problems caused by heat, there are mixed or composite vinyl linings in which the vinyl material is attached directly to a rigid or semi-rigid main layer or substrate having a certain constant thickness, such as cement or fiberglass-reinforced cement, known as fibrocement, thus forming a multilayer lining plate. Fibrocement has an excellent dimensional stability that remains unchanged in response to humidity or temperature changes, and the dimensional stability of fibrocement is ten times higher than the stability of vinyl material.

Nevertheless, the introduction of rigid or semi-rigid materials in the multilayer panel complicates and even prevents being able to actually connect the panels to one another since it is impossible to make any type of male-female groove on the edges of the panels without breaking a portion of the panel. Therefore, the panels either have no grooves and are arranged independently from one another, without acting as a uniform whole, or a groove must be molded together with the fibrocement layer, which makes the lining panel manufacturing process more expensive and longer since it is necessary to arrange molds for the grooves and to manufacture the main layer of the panel by pouring the fibrocement and waiting for it to set, without being able to use prefabricated fibrocement plates for that purpose.

Another added drawback of such multilayer plates is that the rigid or semi-rigid main fibrocement layer has caused difficulties in placing the multilayer lining plate on floors since ductility of the vinyl tile has been lost due to the attachment thereof to the rigid fibrocement layer.

Therefore, vinyl tiles could be easily applied on floor coverings or floors even though their finish is not completely smooth since vinyl is a ductile material that adapts to the imperfections or irregularities that the surface to be lined may have. Nevertheless, by having attached the fibrocement support layer, the resulting panel can hardly adapt to said irregularities and produces a "smacking" effect, a type of noise and certain vertical movement that occur when walking on the panel since the plate is usually only supported by three of its four corners, and upon stepping on the other corner, the plate moves as if it were a lever.

This effect means that floor coverings or floors should not be lined with mixed vinyl and fibrocement plates if they are not completely level and if they have no type of irregularity, which is very hard to find.

Leveling a floor and making sure that its surface is smooth and completely planar involves work and considerable implementation time that is hard to take on, counteracting the placement advantages linked to a vinyl material. Furthermore, in most cases in which the vinyl lining projects from a pre-existing, generally tiled, floor, it is common to find some edges or corners of tiles protruding with respect to adjacent tiles, whereby the lining with a mixed vinyl and fibrocement plate such as those described would only further increase the effect of irregularities due the difference in level, causing a disastrous result from both the aesthetic viewpoint and the personal safety viewpoint.

Based on the foregoing, it would be desirable to have a multilayer lining plate that is dimensionally stable under temperature and humidity conditions, that can be connected with adjacent plates so that the lining acts as a whole, and that is optionally capable of adapting to horizontal surfaces even though these surfaces do not have a perfectly horizontal and smooth finish free of irregularities.

Non-Limiting Overview of the Invention

In order to provide a solution to the drawbacks that have been considered, the present invention discloses a multilayer lining plate for essentially horizontal support surfaces such as floors or floor coverings. It must be pointed out that an essentially horizontal support surface is understood as all those surfaces in contrast to vertical surfaces, such as wall surfaces, so they also include surfaces having a certain inclination, such as ramp surfaces.

The multilayer lining plate object of the invention has a main layer, having at least two longer sides and two shorter sides, including at least one part, and a ductile or flexible upper decorative layer. Preferably, the main layer has a rectangular shape.

The multilayer lining plate object of the invention has along an outer edge of each of the longer sides of the main layer a ductile machinable portion that can be machined to form a connecting profile for connecting the plate with other plates, wherein the at least one part of the main layer is more rigid than the upper decorative layer; and wherein the at least one part of the main layer is preferably made of magnesium oxide, fibrocement or mortar with or without perlite and/or vermiculite and/or cellulose. According to the preferred embodiments, the main layer comprises magnesium oxide with perlite, vermiculite and cellulose. Perlite provides lightness, vermiculite improves fire resistance and cellulose provides continuity, avoiding the breakage of the material.

The inventors have found that it is enough to provide the machinable portions along the outer edge of the longer sides of the main layer in order to be able to form therein a corresponding connecting profile for the connection with other plates by facing the long sides of the plates.

The plates are rectangular and elongated, for instance 20 cm×150 cm, 305 cm×610 cm, that is to say, there is a significant difference between the shorter sides and the longer sides (proportions of 1:7, 1:2, etc.). With these proportions, only part of the perimeter of the main layer can have machinable portions along part of or the whole of the longer sides. It is also possible to have machinable portions along part of or the whole of the shorter sides have. It can be sufficient for the short sides to have machinable portions at their ends that result from the ends of the continuous machinable portions along the outer edge of each of the longer sides of the main layer. Thus, the machinable portions ensure that a connecting profile can be performed along the edges of the longer sides of the plate and it can be tried to perform a connecting profile directly in the outer edges of the shorter sides. There is a risk that the connecting profiles in the main layer can be deteriorated or can break when they are performed directly in the shorter edges of the main layer, but in this case, the plate will allow a good connection with other plates because there is machinable portions in the long sides (which are the sides that take on most of the load) and in end areas of the short sides.

According to a feature of the invention, the machinable portion is made of medium-density fiberboard (MDF), a wood-plastic composite (WPC) material or polyvinyl chloride (PVC).

According to another feature of the invention, the decorative layer is a layer of natural or synthetic plant-based material, mineral-based material, organic material, inorganic material or a mixture thereof, although according to a preferred embodiment, it is a sheet of vinyl material having a thickness comprised between 1 and 10 mm.

According to another feature of the invention, the part or parts of the main layer are made of magnesium oxide, fibrocement, also referred to as natural or synthetic fiber-reinforced cement, or mortar with perlite and vermiculite, and the thickness of the main layer which is made of magnesium oxide, fibrocement, also referred to as natural or synthetic fiber-reinforced cement, or mortar with perlite and/or vermiculite and/or cellulose measured in the normal direction with respect to the surface of the decorative layer is equal to or greater than 2.5 mm. In addition to providing strength to the plate, these materials have high dimensional stability since they absorb water or humidity without swelling or changing their dimensions.

Plates with wood or wood-based cores can have bad behaviour related to their dimensional stability in response to humidity.

In accordance with the current regulations for modern synthetic flooring, plates for horizontal support surfaces such as floors or floor coverings must be tested to determine their dimensional stability. According to this test, a plate must be heated until an extreme temperature and then coming back to a stabilization temperature, this is to say, a plate, which is initially at 23° C., is heated at 80° C. for 360 min and then, heat stops and the plate comes back to the temperature of 23° C. This test is intended to measure the planimetry of the plate in a situation wherein a sunbeam goes through the glass of a window, heating a certain area of the plate to an extreme temperature (magnifying glass effect).

The inventors have carried out tests to determine the dimensional stability of a plate according to the invention, particularly with embodiments wherein the main layer is made of magnesium oxide and has a thickness of about 4 mm and the decorative layer is made of PVC with a thickness between 1.8 and 2 mm, and the dimensional stability of a plate made of WPC and vinyl. The results show that the dimensional stability of the plate according to the invention has an average curling of 0 mm and an average dimensional change of 0.10%, whereas the WPC and vinyl plate shows that the curling is too obvious and it could not be measured, and a dimensional change of 2.85%. Therefore, it is clear that the plate according to the invention has a dimensional stability far better than wooden or wood-based plates, even with a decorative layer of vinyl.

With regard to vinyl and polymer flooring plates, they show a right dimensional stability, because although they are heated, they are not deformed and come back to their original dimensions.

However, the determination of the dimensional stability does not inform about the behaviour of flooring plates when they are at a temperature lower than 23° C.

Therefore, although vinyl linings or plates of plastic may pass the above explained test, it does not mean that these plates are going to behave properly in daily life conditions. The inventors recognize that the floor in a room is rarely always at 23° C. In summer time the flooring plates can remain at 45° C. for long periods and in winter they can remain at 5° C. if one considers, for instance, the plates in an industrial plant. There is no regulation to test the variation in the dimensions of a plate in these conditions, although in daily life, the expansion coefficient and the contraction coefficient of flooring plates play a crucial role, according to the professional experience of the applicant.

The inventors are aware of the high importance of the expansion coefficient and the contraction coefficient of flooring plates because they have observed the significant problems that can arise when plates have high coefficients. If the expansion coefficient is high, it means that the length of the plate increases and a plate can collide with the next one, the male connection profile penetrates into the female connection profile of the next plate and can raise and break one of the tabs of the female connection profile.

If the contraction coefficient is high, it means that the length of the plate decreases and the distance between two plates increases, that is to say, the joints open. In cold temperatures, this is what happens with PVC plates.

Since the inventors have detected the great important of these coefficients, they have tested a plate according to the invention and a resilient flooring plate (resilient flooring plates are those made of WPC, PVC and copolymers) to determine such coefficients by creating the following procedures.

The expansion test involves: a) stabilizing the sample of the plate at 23° C. and measuring its dimensions, b) heating the sample plate to 40° C., stabilizing it and measuring its dimensions, and c) allowing the sample plate to cool, stabilizing at 23° C. and measuring its dimensions.

The contraction test involves: a) stabilizing the sample of the plate at 23° C. and measuring its dimensions, b) cooling the sample plate to 5° C., stabilizing it and measuring its dimensions, and c) allowing the sample to heat, stabilizing at 23° C. and measuring its dimensions.

According to the results, the plates according to the invention have an expansion length average at 40° C. of about 0.105 mm/ml (ml is linear meter) and a contraction length average at 5° C. of about 0.472 mm/ml. On the other hand, the resilient flooring plates made of vinyl have an expansion length average at 40° C. of about 1.282 mm/ml and a contraction length average at 5° C. of about 1.192 mm/ml. Therefore, the comparison of the results show that the plates according to the invention have far better expansion and contraction coefficients than resilient flooring plates. It must be said that the coefficients with WPC plates are similar to the ones of vinyl plates.

The differences between the expansion and contraction behaviour are more than significant, clearly showing that the plates according to the invention have a better behaviour and do not suffer from the problems explained before.

Additionally, vinyl plates usually measure 1 m or 1.20 m and they are tending to extra-large formats. The plates will get irreversibly deformed. Vinyl has two negative effects when heated: (1) expansion and (2) it becomes weaker from a structural point of view. At 40° C. it softens so much that a person can bend it with his hand, it seems like a chewing gum. In order to make a connection system between plates work, there has to be at least a minimum rigidity.

The plate according to the invention expands much less, is more rigid and therefore, is not so structurally vulnerable when it is subjected to movements by thermal differences heat-cool.

The vinyl plates alone cannot push, because when a plate is heated, it is soft and therefore cannot push the plates next to it in order that the end of the flooring moves and reaches the expansion joint (for instance the joint next to a wall. When vinyl plates are heated, they cannot move the plates next to them. The movement is impossible because plates have been softened due to the heat, and instead of moving, the plates do not find space to expand themselves and they get curved.

On the other side, when the temperature is low, the vinyl plate wants to become smaller, but in a flooring system, one plate is connected to the other one by the connecting profiles. With cooling, plates are separated but instead of pulling to the plates which are next to them, plates get separated when the first plates shrink because the tab of the connection profile also shrinks.

The problem detected by the inventors related to expansion and contraction behaviour of the floor plates in daily life conditions has been solved by the multilayer plate of the present invention. The plate shows a good behaviour and does not suffer from the problems explained above, due to having been able to combine the cited materials in order to have low expansion and contraction coefficients. Preferably, the main layer and the machinable portion have a thickness measured in the normal direction with respect to the surface of the decorative layer comprised between 3 mm and 10 mm.

According to one embodiment of the invention, the main layer is configured by a plurality of individual parts arranged adjacent to and facing one another by at least one of their side faces. The individual parts can be rectangular prismatic parts having planar and vertical side sides, and they can be separated from one another leaving a small empty space or a strip of a compressible or spongy material can be arranged in said space.

According to another feature of the invention, the multilayer lining plate can further comprise, arranged below the main layer, a continuous and flexible support layer, preferably of polyvinyl chloride (PVC), a wood-plastic composite (WPC) material or high-pressure laminate (HPL), in this case only when the main layer is manufactured by a single part made of a rigid or semi-rigid material. The support layer provides certain flexibility to the multilayer assembly while at the same time reinforces the lower portion of the plate, which is quite necessary in those plates in which the machined connecting profiles in the ductile machinable portion usually have a very small thickness in the lower portion thereof. The support layer preferably has a thickness equal to or greater than 0.25 mm and less than or equal to 5 mm. Particularly when the support layer is of PVC or HPL, the thickness is usually comprised between 0.3 and 1.5 mm, whereas with WPC the thickness is usually equal to or greater than 3 mm.

According to another feature of the invention, in the lining plate the outer face of the machinable portion oriented opposite the main layer is formed as a connecting profile for the connection with other plates, which results from having machined the mentioned profile in the machinable portion provided for such purpose.

BRIEF DESCRIPTION OF THE DRAWINGS

The attached drawings illustrate embodiments of the multilayer lining plate object of the invention and several phases of the method of manufacturing same by way of non-limiting example. In said drawings.

DETAILED DESCRIPTION OF CERTAIN EMBODIMENTS OF THE INVENTION

Figure 1:
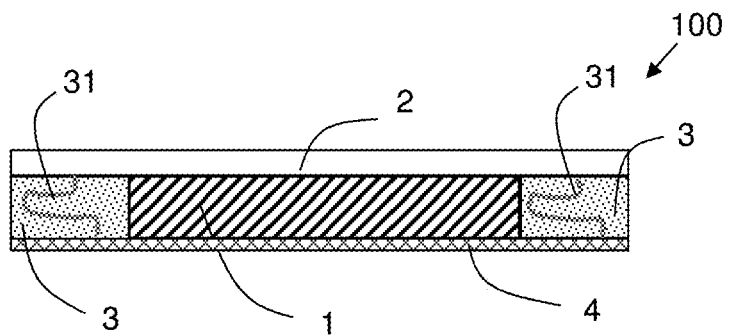
FIG. 1 shows a cross section of a preferred embodiment of the multilayer lining plate object of the invention.
Figure 2:
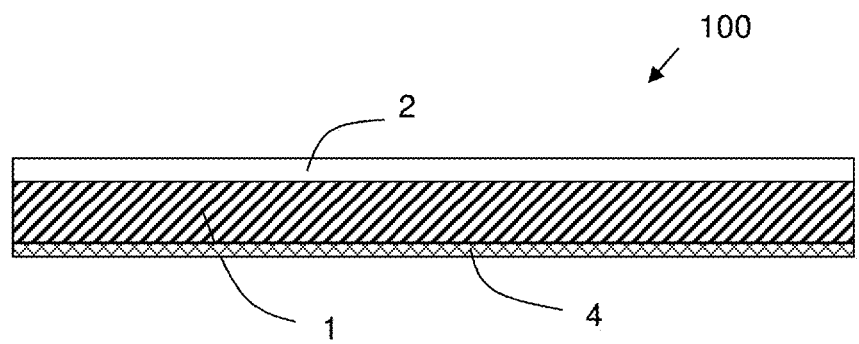
FIG. 2 shows a longitudinal section of the multilayer lining plate of FIG. 1.
Figure 3:
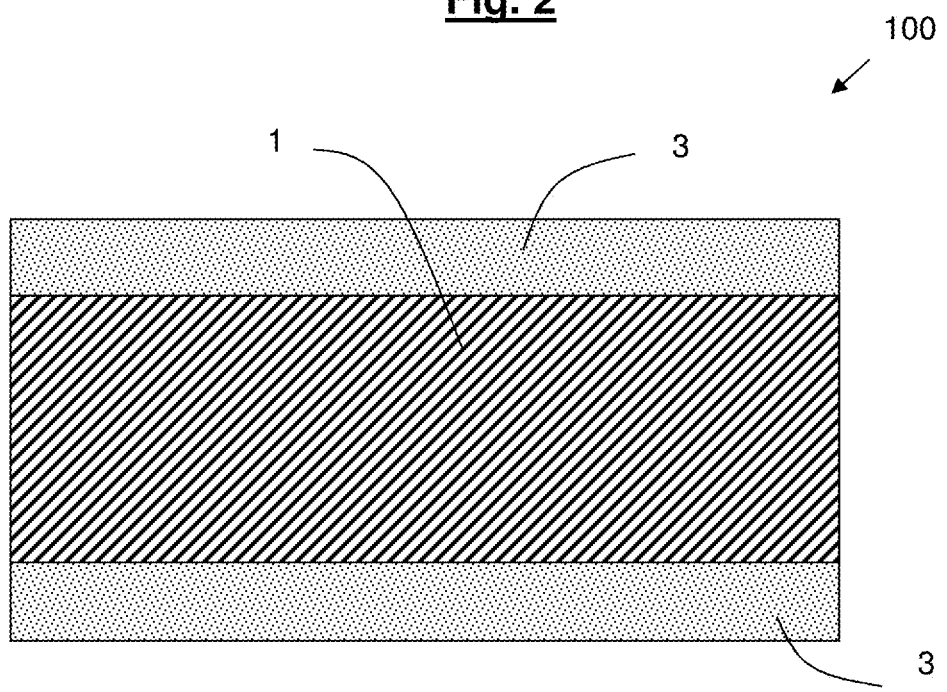
FIG. 3 shows a horizontal section of the multilayer lining plate of FIG. 1 at the level of the main layer.
Figure 4:
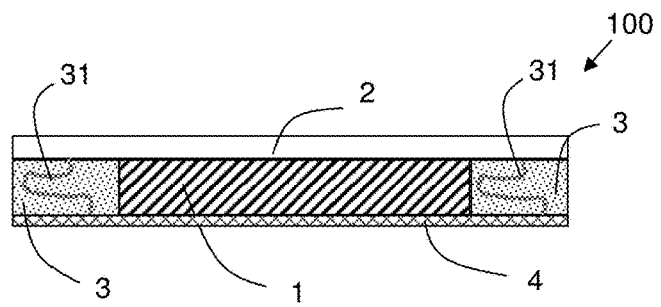
FIGS. 4, 5 and 6 are a cross section, a longitudinal section and a horizontal section of a second embodiment of the multilayer lining plate object of the invention.
Figure 5:
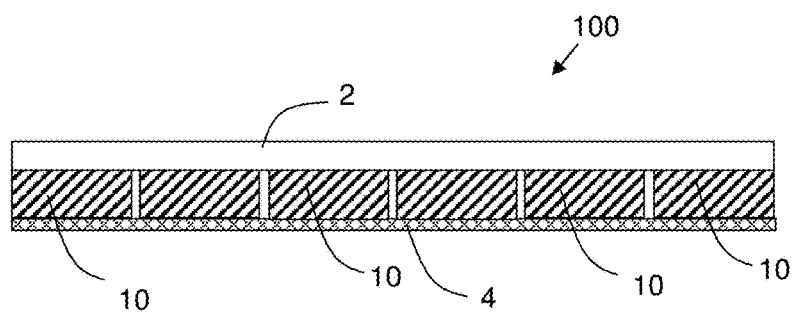
Figure 6:
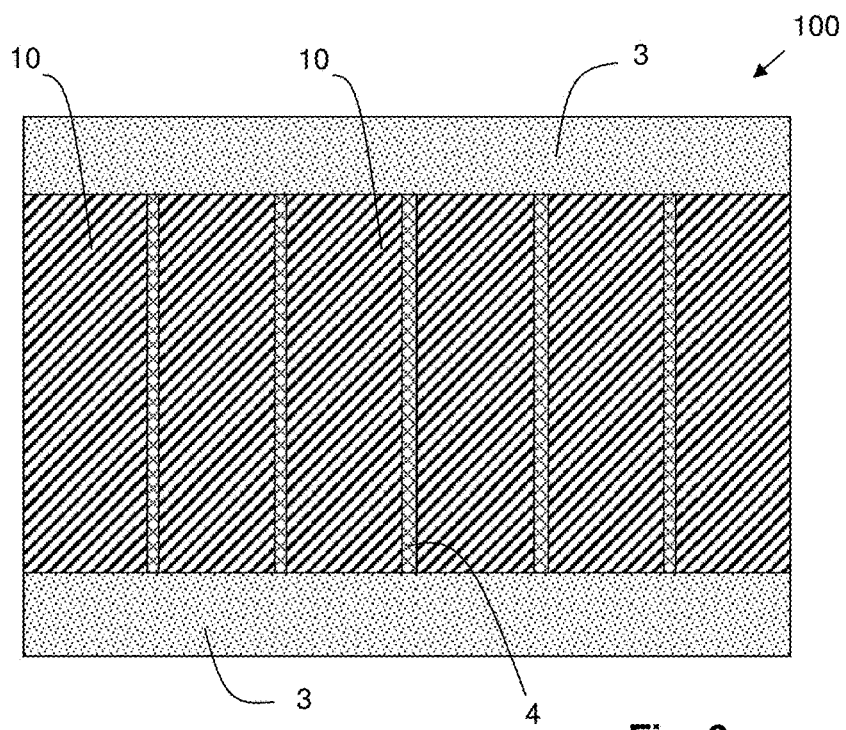

FIGS. 1-3 and 4-6 show two embodiments of a multilayer lining plate 100 for essentially horizontal support surfaces such as floors or floor coverings, comprising at least one main layer 1 of rigid or semi-rigid material and a ductile or flexible upper decorative layer 2. It can be seen, particularly in FIGS. 3 and 6, that each plate 100 is rectangular, that is to say, it has two longer sides and two shorter sides, and comprises along the two outer edges of the longer sides of the main layer 1 a respective ductile machinable portion 3 that can be machined to form a connecting profile 31 for the connection of the plate with other plates, an example of a connecting profile 31 that can be machined in the machinable portion 3 being depicted with a gray line in FIGS. 1 and 4. FIGS. 3 and 6 show the sections of said plates 100 according to a horizontal section plane at the height of the main layer 1.

The machinable portion 3 is made of medium-density fiberboard (MDF), a wood-plastic composite (WPC) material or polyvinyl chloride (PVC). These materials allow subsequent machining so that the user or supplier of the plate 100 can machine a male-female type groove according to the chosen shape of the connecting profile 31, therefore resulting in a very versatile plate 100. In principle, the plate 100 is therefore not limited to any specific design for the connecting profile 31, since it provides the possibility of forming the side edges of the plate 100 with the profile deemed most appropriate by each user or supplier. The materials described for the machinable portion 3 allow forming a connecting profile 31 without problems since they do not break and they allow reproducing any shape, regardless of how narrow some segments of the profile may be. As an example, it has been found that the arrangement of a machinable portion 3 having a width of about 3 or 4 cm is enough to form most connecting profiles 31.

The decorative layer 2 is a ductile or flexible layer, i.e., it allows slight bending, for example, for adapting to certain irregularities of the floor 6 if required. It can be a layer of natural or synthetic plant-based material, mineral-based material, organic material, inorganic material or a mixture thereof, although it is preferably a sheet of vinyl material having a thickness comprised between 1 and 10 mm or of luxury vinyl tile (LVT). The thickness of the decorative layer 2 is preferably comprised between 1.5 and 3 mm, being 2 mm, for example. As a guideline, the vinyl material of the decorative layer 2 has a mean coefficient of thermal expansion of 0.95 mm/m° C. and a mean coefficient of thermal shrinkage of 0.12 mm/m° C., according to laboratory tests conducted by applying maximum temperatures of 50° C. and minimum temperatures of 5° C., starting from 25° C.

Depending on the type of decorative layer 2, said layer 2 can incorporate an outer covering (not depicted) to protect it against wear or external elements. In addition to being resistant, said outer covering must be made of a material that allows correctly viewing the decorative layer 2 it covers. As an example, the material of this outer covering can be transparent and highly resistant polyurethane.

With respect to the main layer 1, said layer 1 is formed by a single part (plate 100 of FIGS. 1 to 3) or several individual parts 10 (plate 100 of FIGS. 4 to 6), and the rigid or semi-rigid material is preferably magnesium oxide, fibrocement (fiber-reinforced cement hereinafter referred to as fibrocement) or mortar with perlite and/or vermiculite and or cellulose. These materials have an excellent behavior with respect to temperature changes and in humid environments because although they can absorb water, they do not swell, i.e., they are dimensionally very stable, while at the same time they give the panel the strength necessary for supporting the weight and mechanical requirements that are typical of a lining for a horizontal support surface such as a floor or floor covering. The main layer 1 preferably has a thickness measured in the normal direction with respect to the surface of the decorative layer 2 equal to or greater than 2.5 mm, between 3 and 10 mm, and preferably about 4 mm. For example, when the main layer 1 is of magnesium oxide or fibrocement, it preferably has a thickness of about 4 mm. In fact, when the main layer 1 is formed by a single part (FIGS. 1 to 3), the thickness is usually between 3 and 4 mm. In contrast, when it is formed by several individual parts 10, the main layer 1 can exceed 4 mm in thickness because dividing it into individual parts 10 confers certain flexibility to the layer and adaptation of the plate 100 to the horizontal surface. As a guideline, both fibrocement and magnesium oxide which can be the material of the main layer 1 have a mean coefficient of thermal expansion of 0.035 mm/m° C. and a mean coefficient of thermal shrinkage of 0.035 mm/m° C., according to laboratory tests conducted by applying maximum temperatures of 50° C. and minimum temperatures of 5° C., starting from 25° C.

On the other hand, it must be taken into account that the thickness of the machinable portion 3 can be equal to, less than or greater than the thickness of the main layer 1.

Preferably, in the plates 100 wherein the main layer 1 is formed by several individual parts, each part is rectangular prismatic arranged adjacent to and facing one another by at least one of their side faces. In the plate 100 of FIGS. 5 and 6, it can be seen that the individual parts 10 are separated from one another by an empty space, although according to other embodiments, there can be a strip of compressible or spongy material between one individual part 10 and the next. The individual parts 10 allow adapting to small irregularities of the floor, and since they are adhered on the upper portion to the ductile and flexible decorative layer 2, it is possible for the individual parts 10 to move, for example, inclining slightly, with respect to one another according to said irregularities, said movement being translated into the compression or expansion of the spongy material.

It must also be pointed out that, as seen in FIGS. 1, 2, 4 and 5, the plate 100 comprises a continuous and flexible support layer 4 attached below the main layer 1 and the machinable portions 3. The materials forming the support layer 4 preferably include polyvinyl chloride (PVC), a wood-plastic composite (WPC) material, and high-pressure laminate (HPL). The support layer 4 is preferably of PVC or WPC, since they are waterproof materials. Particularly, the support layer 4 can only be of HPL if the main layer 1 is formed by a single part, such as the plate 100 of FIGS. 1 to 3. The thickness of the support layer 4 is less than or equal to 5 mm, although preferably when it is a layer of PVC or of HPL, the thickness is between 0.3 and 1.5 mm, and when it is a layer of a WPC, the thickness can be equal to or greater than 3 mm.

The lining plate 100 can be placed so as to be floating on the horizontal support surface, although it can also be adhered to the surface through a self-adhesive layer adhered to the lower face of the individual parts 10. The adhesive of the self-adhesive layer can comprise ethyl acetate or an ethylene vinyl acetate copolymer, and the self-adhesive layer can be externally covered by a sheet of paper (not depicted in the drawings) that can be peeled off by the user when placing the plates 100 on the floor or floor covering.

Figure 7:
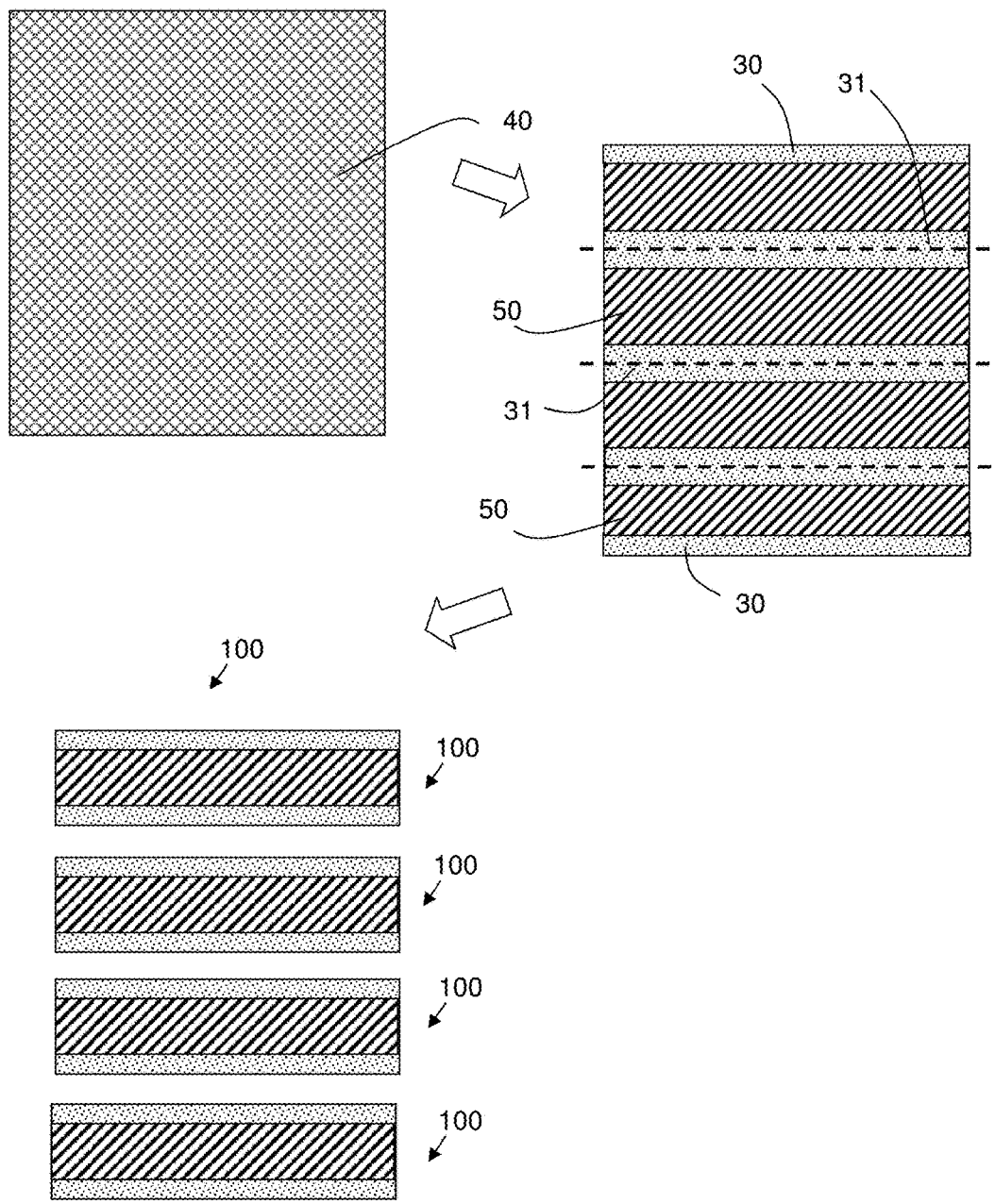
FIG. 7 shows a diagram of some phases involved in the manufacturing the multilayer plate of FIGS. 1-3.

The plates 100 described above, particularly the plates of FIGS. 1 to 3, can be efficiently and economically manufactured following the method the phases of which are schematically depicted in FIG. 7 and described below.

A stratum 40 of rectangular-shaped flexible material which will form the support layer 4 is first arranged. Then glue or an adhesive is applied to the upper face of the stratum 40 in order to arrange thereon two strips 30 and several additional strips 31 made of a ductile machinable material, such as the material forming the machinable portions 3 of the panel 100.

The strips 30, that have half of the width of additional strips 31, are used to cover two parallel sides of the area of the surface, whilst a series of additional strips 31 runs parallel to the strips 30 on an inner area of the stratum 40.

Afterwards, rectangular plates 50 made of a rigid or semi-rigid material having the same thickness as the strips 30 and, 31 are placed such that each rectangular plate 50 takes up each of the spaces existing between the strips 30 and 31 or between two additional strips 31. The plates 50 are made of the same material as the main layer 1. A stratum of ductile or flexible material (not shown), decorated on one face, can be then arranged, and glue or an adhesive is applied on the face opposite the decorated face in order to subsequently place this face with glue on the arrangement of strips 30, 31, and plates 50, forming an assembly. The stratum of the ductile or flexible material must have some marks tracing a line according to the middle of the width of each additional strip 31, in order to know where to cut in the next step.

Then, the assembly formed is divided by making cuts parallel to the direction of the strips 30 and 31, as depicted by dashed lines, said cuts vertically coinciding with the longitudinal axis of the additional strips 31. Dividing by cutting results in obtaining several lining plates 100, four according to the example of FIG. 7. Of course depending on the number of additional strips 31 and on the distance between the strips 30-31 and 31-31, a larger or smaller number of lining plates 100 will be manufactured. As it can be noticed, the direction along which the strips 30 and 31 are laid determines the direction of the longer sides of the produced lining plates 100.

The invention claimed is:

1. A multilayer lining plate for essentially horizontal support surfaces such as floors or floor coverings, comprising a main layer having at least two longer sides and two shorter sides, including at least one part, and a ductile upper decorative layer, wherein the lining plate comprises along an outer edge of longer sides of the main layer a ductile machinable portion that can be machined to form a connecting profile for connection of the lining plate with other plates;
   wherein the at least one part of the main layer is more rigid than the upper decorative layer; and
   wherein the at least one part of the main layer is made of at least one of:
   (a) magnesium oxide with at least one of perlite, vermiculite or cellulose,
   (b) fibrocement with at least one of perlite, vermiculite or cellulose, or
   (c) mortar with at least one of perlite, vermiculite or cellulose; and
   wherein the machinable portion is made of medium-density fiberboard, a wood-plastic composite material or polyvinyl chloride.

2. The plate according to claim 1, wherein the main layer has a thickness measured in the normal direction with respect to the surface of the decorative layer equal to or greater than 2.5 mm.

3. The plate according to claim 1, wherein the main layer and the machinable portion have a thickness measured in the normal direction with respect to the surface of the decorative layer comprised between 3 mm and 10 mm.

4. The plate according to claim 1, wherein the main layer is configured by a plurality of individual parts arranged adjacent to and facing one another by at least one respective side face of the plurality of individual parts.

5. The plate according to claim 4, wherein the individual parts are separated from one another by a strip of compressible or spongy material.

6. The plate according to claim 1, wherein the plate further comprises a continuous support layer arranged below the main layer and that is flexible relative to the at least one part of the main layer.

7. The plate according to claim 6, wherein the support layer is of polyvinyl chloride or a wood-plastic composite material.

8. The plate according to claim 1, wherein the main layer is manufactured by a single part and wherein the plate further comprises a continuous support layer of high-pressure laminate arranged below the main layer.

9. The plate according to claim 7, wherein the support layer has a thickness equal to or greater than 0.25 mm.

10. The plate according to claim 7, wherein the support layer has a thickness less than or equal to 5 mm.

11. The plate according to claim 7, wherein the support layer has a thickness comprised between 0.3 and 1.5 mm.

12. The plate according to claim 1, wherein the decorative layer is a layer of natural or synthetic plant-based material, mineral-based material, organic material, inorganic material or a mixture thereof.

13. The plate according to claim 1, wherein the decorative layer is a sheet of vinyl material having a thickness comprised between 1 and 10 mm.

14. The plate according to claim 1, wherein the outer face of the machinable portion oriented opposite the main layer is formed as a connecting profile for the connection with other plates.

15. A lining plate for flooring, comprising:
   a rectangular main layer having two long sides and two short sides and comprising at least one of:
      (a) magnesium oxide with at least one of perlite, vermiculite or cellulose,
      (b) fibrocement with at least one of perlite, vermiculite or cellulose, or
      (c) mortar with at least one of perlite, vermiculite or cellulose;
   a ductile upper decorative layer; and
   a ductile machinable portion, along an outer edge one of the long sides, made of medium-density fiberboard, a wood-plastic composite material or polyvinyl chloride, and configured to be machined to form a connecting profile for connection of the lining plate with other lining plates;
   wherein the main layer is more rigid than the upper decorative layer.

16. A multilayer lining plate for essentially horizontal support surfaces such as floors or floor coverings, comprising a main layer having at least two longer sides and two shorter sides, including at least one part, and a ductile upper decorative layer, wherein the lining plate comprises along an outer edge of longer sides of the main layer a ductile machinable portion that can be machined to form a connecting profile for connection of the lining plate with other plates;
    wherein the at least one part of the main layer is more rigid than the upper decorative layer; and
    wherein the at least one part of the main layer is made of at least one of:
    (a) magnesium oxide with at least one of perlite, vermiculite or cellulose,
    (b) fibrocement with at least one of perlite, vermiculite or cellulose, or
    (c) mortar with at least one of perlite, vermiculite or cellulose;
    wherein the main layer is configured by a plurality of individual parts arranged adjacent to and facing one another by at least one respective side face of the plurality of individual parts.

17. The plate according to claim 16, wherein the individual parts are separated from one another by a strip of compressible or spongy material.

18. A multilayer lining plate for essentially horizontal support surfaces such as floors or floor coverings, comprising a main layer having at least two longer sides and two shorter sides, including at least one part, and a ductile upper decorative layer, wherein the lining plate comprises along an outer edge of longer sides of the main layer a ductile machinable portion that can be machined to form a connecting profile for connection of the lining plate with other plates;
    wherein the at least one part of the main layer is more rigid than the upper decorative layer; and
    wherein the at least one part of the main layer is made of at least one of:
    (a) magnesium oxide with at least one of perlite, vermiculite or cellulose,
    (b) fibrocement with at least one of perlite, vermiculite or cellulose, or
    (c) mortar with at least one of perlite, vermiculite or cellulose;
    wherein the plate further comprises a continuous support layer arranged below the main layer and that is flexible relative to the at least one part of the main layer; and
    wherein the support layer is of polyvinyl chloride or a wood-plastic composite material.

19. A multilayer lining plate for essentially horizontal support surfaces such as floors or floor coverings, comprising a main layer having at least two longer sides and two shorter sides, including at least one part, and a ductile upper decorative layer, wherein the lining plate comprises along an outer edge of longer sides of the main layer a ductile machinable portion that can be machined to form a connecting profile for connection of the lining plate with other plates;
    wherein the at least one part of the main layer is more rigid than the upper decorative layer; and
    wherein the at least one part of the main layer is made of at least one of:
    (a) magnesium oxide with at least one of perlite, vermiculite or cellulose,
    (b) fibrocement with at least one of perlite, vermiculite or cellulose, or
    (c) mortar with at least one of perlite, vermiculite or cellulose;
    and wherein the main layer is manufactured by a single part and wherein the plate further comprises a continuous support layer of high-pressure laminate arranged below the main layer.

\* \* \* \* \*